(12) United States Patent
Sudworth

(10) Patent No.: US 9,065,133 B2
(45) Date of Patent: Jun. 23, 2015

(54) CATHODE FOR AN ELECTROCHEMICAL CELL

(75) Inventor: James Sudworth, Burton on Trent (GB)

(73) Assignee: General Electric Company, Schenectady, NY (US)

( * ) Notice: Subject to any disclaimer, the term of this patent is extended or adjusted under 35 U.S.C. 154(b) by 624 days.

(21) Appl. No.: 12/519,784

(22) PCT Filed: Jan. 23, 2008

(86) PCT No.: PCT/GB2008/000239
§ 371 (c)(1),
(2), (4) Date: Jun. 18, 2009

(87) PCT Pub. No.: WO2008/090344
PCT Pub. Date: Jul. 31, 2008

(65) Prior Publication Data
US 2010/0068610 A1    Mar. 18, 2010

(30) Foreign Application Priority Data
Jan. 25, 2007    (GB) .................... 0701370.9

(51) Int. Cl.
*H01M 10/0561* (2010.01)
*H01M 4/38* (2006.01)
*H01M 4/46* (2006.01)
*H01M 4/58* (2010.01)
*H01M 10/39* (2006.01)
*H01M 4/02* (2006.01)

(52) U.S. Cl.
CPC *H01M 4/38* (2013.01); *H01M 4/46* (2013.01); *H01M 4/582* (2013.01); *H01M 10/0561* (2013.01); *H01M 10/399* (2013.01); *H01M 2004/028* (2013.01)

(58) Field of Classification Search
USPC .................................. 429/102, 103
See application file for complete search history.

(56) References Cited

U.S. PATENT DOCUMENTS

| 5,972,533 | A | 10/1999 | Coetzer et al. |
| 2003/0047038 | A1* | 3/2003 | Iwasaki et al. .................. 75/707 |
| 2004/0151957 | A1* | 8/2004 | Brooks et al. .................... 429/20 |
| 2006/0024582 | A1* | 2/2006 | Li et al. ......................... 429/232 |
| 2010/0068610 | A1 | 3/2010 | Sudworth |
| 2010/0068623 | A1* | 3/2010 | Braun et al. .................. 429/219 |
| 2011/0070496 | A1 | 3/2011 | Soloveichik et al. |
| 2011/0104563 | A1 | 5/2011 | Galloway et al. |

FOREIGN PATENT DOCUMENTS

| EP | 08227708 | * 9/1996 | ............. H01M 4/02 |
| GB | 219133 A | 12/1987 | |

(Continued)

OTHER PUBLICATIONS

Galloway etal., Method of making a cathode for a high temperature rechargeable electrochemical cell, GB2281436.*

(Continued)

*Primary Examiner* — Patrick Ryan
*Assistant Examiner* — Jose Colucci Rios
(74) *Attorney, Agent, or Firm* — Dority & Manning, P.A.

(57) ABSTRACT

The invention provides a cathode for an electrochemical cell comprising: a first particulate material having particles comprising a mixture of at least one alkali metal halide and at least one metal; and a second particulate material comprising at least one alkali metal halide, wherein the second particulate material has a particle size smaller than that of the first particulate material.

10 Claims, 4 Drawing Sheets

(56) References Cited

FOREIGN PATENT DOCUMENTS

| GB | 2281436 | * | 3/1995 | ............ H01M 10/39 |
|---|---|---|---|---|
| GB | 2281436 A | | 3/1995 | |
| JP | 08227708 A | | 9/1996 | |
| WO | 97/32350 A | | 9/1997 | |

OTHER PUBLICATIONS

Susuki, Electrode and Secondary battery using the electrode, EP08227708.*

Galloway etal., GB2281436, Method of making a cathode for a high temperature rechargeable electrochemical cell, Jan. 3, 1995.*

Susuki, EP08227708, Electrode and Secondary battery using the electrode, Mar. 9, 1996.*

International Search Report issued by the EP Searching Authority for PCT/GB2008/000239 file don Jan. 23, 2008.

Written Opinion issued by the EP Searching Authority for PCT/GB2008/000239 file don Jan. 23, 2008.

European search report issued in connection with related EP Patent Application No. 13192515.8 dated Jun. 26, 2014.

* cited by examiner

CATHODE FOR AN ELECTROCHEMICAL CELL

BACKGROUND OF THE INVENTION

The present invention relates to a cathode for an electrochemical cell. In particular, the cathode of the present invention is for use in a high temperature rechargeable electrochemical cell.

It is known that an effective way of handling a cathode in the form of a powdered mixture (as described in GB 2,182,194 A, for example) is to form granules, as in GB 2,281,436 B. The resulting granules are free flowing and prevent segregation of the different constituents of the electrode. Typically, the granules contain nickel, iron, sodium chloride, sodium fluoride, sodium iodide and aluminium.

Although granular electrodes are easier to handle than powdered electrodes, it has now been found that when they are assembled into an electrochemical cell, gaps or spaces are created between the granules thereby reducing the capacity density of the resulting electrode. While it has been found that it is possible to increase the capacity density by increasing the ratio of sodium chloride to metal in the granules, because the density of the sodium chloride is much less than the density of iron or nickel, the bulk density of the resulting granulate is reduced. This method also causes an undesirable increase in the utilisation of the metal because the increase in sodium chloride in the granules reduces the amount of metal in the electrode. The higher the utilisation of the metal, the less metal available as a conducting backbone and the more rapid the rate of degradation of performance of the electrochemical cell. For example, increasing the amount of sodium chloride by a factor of 1.5 in the granules reduces the bulk density of the granules by 10% and increases the capacity density by only 14%, with an associated increase in the utilisation of the metal from 0.3 Ah/g to 0.46 Ah/g.

As described in GB 2,281,436 B, aluminium is added to an electrode for generating porosity as it forms sodium chloroaluminate and thus promotes full charge on the maiden charge. In addition, the aluminium generates a small amount of sodium to wet the anode compartment side of the solid electrolyte separator, and also provides some overdischarge capacity. However, it has now been found that the presence of aluminium in the powdered mixture used to form granules results in granules that are more hygroscopic i.e., the powdered mixture becomes more humidity-sensitive after the compaction and granulation process. Without wishing to be bound by theory, this is thought to be because when the aluminium powder is present in the powdered mixture, the granulation process disrupts the oxide film on the aluminium making the aluminium much more reactive. The resulting granules take up water at a much greater rate than the blended powder-mix.

Since the presence of even small quantities of moisture is wholly undesirable, it is important to prepare the granules in dry conditions. Even small quantities of moisture cause vigorous effervescence with the liberation of gaseous hydrogen chloride upon the dispersion of a molten salt electrolyte about the granules.

Thus, there remains a need for an improved cathode which solves one or more of the problems described above.

The listing or discussion of a prior-published document in this specification should not necessarily be taken as an acknowledgment that the document is part of the state of the art or is common general knowledge.

BRIEF DESCRIPTION OF THE INVENTION

In a first aspect of the present invention, there is provided a cathode for an electrochemical cell comprising:

a first particulate material having particles comprising a mixture of at least one alkali metal halide and at least one metal; and
a second particulate material comprising at least one alkali metal halide, wherein the second particulate material has a particle size smaller than that of the first particulate material.

In a second aspect, the invention provides an electrochemical cell comprising a cathode of the first aspect of the invention.

In a third aspect of the invention, there is provided a method of producing a cathode comprising the step of contacting a first particulate material having particles comprising a mixture of at least one alkali metal halide and at least one metal with a second particulate material comprising at least one alkali metal halide wherein the second particulate material has a particle size smaller than that of the first particulate material.

In a fourth aspect of the invention, there is provided a method of producing an electrochemical cell according to the second aspect of the invention comprising the step of loading a cathode according the first aspect of the invention into an electrochemical cell.

Finally, in a fifth aspect of the invention, there is provided the use of a composition comprising:

a first particulate material having particles comprising a mixture of at least one alkali metal halide and at least one metal; and
a second particulate material comprising at least one alkali metal halide, wherein the second particulate material has a particle size smaller than that of the first particulate material, as a cathode in an electrochemical cell. Thus, the fifth aspect provides the use of a cathode according to the first aspect of the invention as a cathode in an electrochemical cell.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
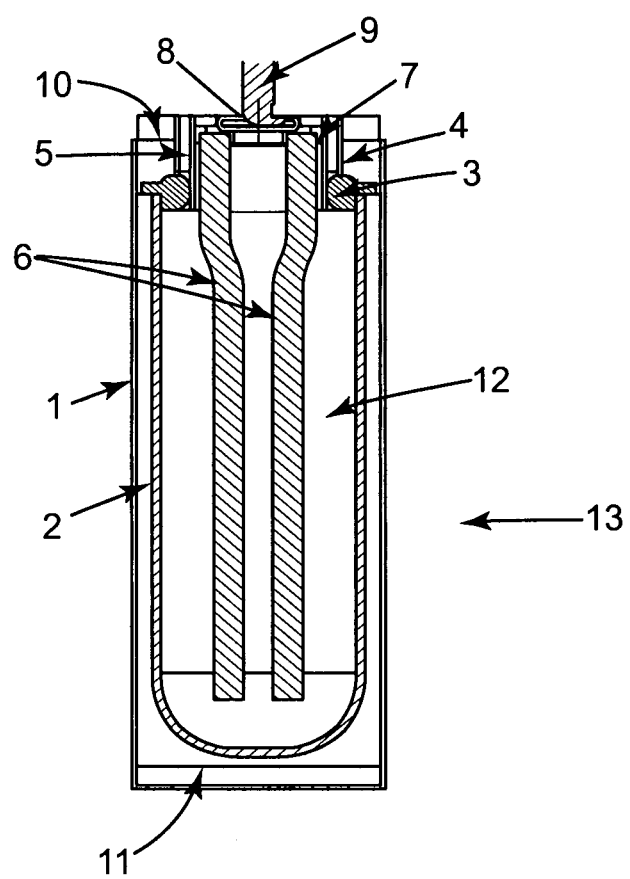
FIG. 1 shows, diagrammatically, a sectional view of a cell in accordance with the present invention.

The present invention provides a cathode for an electrochemical cell comprising a first particulate material and a second particulate material, wherein the second particulate material has a particle size smaller than that of the first particulate material. When the first particulate material is included within a cathode, the second particulate material can at least partially fill (i.e., occupy) the interstices, gaps or spaces (i.e., the free space) formed between the particles of the first particulate material. For example, preferably more than 5% of the volume of the free space is occupied by the second particulate material, such as more than 10% or more than 15%, most preferably more than 20%, such as more than 25%. Surprisingly, this arrangement can provide an increase in the capacity density of the cathode and may also limit the increase in the utilisation of the metal (normally quoted as Ah/g of metal).

The first and second particulate materials comprise at least one alkali metal halide. Advantageously, the alkali metal halide(s) is/are selected from the halides of sodium, lithium, potassium and mixtures thereof. The halides of sodium are particularly preferred. Most preferably, the first and second particulate materials comprise sodium chloride. Surprisingly, it has been found that the performance of the electrochemical cell may not be adversely affected despite components in the second particulate material, such as alkali metal halide(s), for example, sodium chloride, not being intimately mixed with the metal in the first particulate material. In particular, it has been found that almost all of the theoretical capacity is available on the first charge cycle, for example, at least 50% (such as, at least 60%, 70% or 75%) of the theoretical capacity is obtained, preferably at least 80% (such as, at least 85%), most preferably at least 90%.

In one embodiment, the first and second particulate materials comprise the same alkali metal halide(s). The first and second particulate materials may be the same or different in terms of composition.

Typically, the first and/or second particulate materials comprise sodium chloride, together with sodium iodide and/or sodium fluoride.

The first particulate material typically comprises sodium chloride in an amount of at least 10 wt %, such as at least 15 wt % or at least 20 wt %, most preferably at least 25 wt %, such as at least 30 wt % or at least 35 wt %. In the most preferred embodiment, the first particulate material comprises from 20 wt % to 60 wt % sodium chloride, such as from 30 wt % to 50 wt % or from 35 wt % to 45 wt % (for example about 40 wt %).

The first particulate material preferably comprises sodium fluoride in an amount of up to 10 wt %, such as from 0.1 wt % to 5 wt % or from 0.1 wt % to 3 wt %. Additionally or alternatively, the first particulate material may comprise sodium iodide in an amount of up to 1 wt %, such as from 0.05 wt % to 0.3 wt %.

Preferably, the weight ratio of the amount of alkali metal halide in the first particulate material to the amount in the second particulate material is in the range of from 10:1 to 1:1, more preferably from 5:1 to 2:1 by weight.

Sodium fluoride may be added to the first and/or second particulate materials in a total amount of up to 10 wt %, such as up to 8 wt %, up to 5 wt %, from 0.01 to 3 wt % or from 0.1 to 1.5 wt % based on the weight of the particulate material (i.e., based on the total weight of the first and second particulate materials). Sodium fluoride may provide useful extra cell capacity and is very volume efficient. Additionally it is very weight efficient. As for example, 1 g of sodium fluoride gives 0.63 Ah, while 1 g of sodium chloride gives 0.46 Ah. Moreover, inclusion of sodium fluoride in amounts as low as 1.5% by weight can improve the long term stability of the cell and reduce its sensitivity to overcharge. Thus, the potential span on charge typically increases by the inclusion of sodium fluoride.

The first particulate material comprises at least one metal. The second particulate material may also comprise at least one metal. The second particulate material may comprise the same metal(s) as the first particulate material. The metal(s) in the first and/or second particulate materials is/are preferably selected from the group of transition metals, in particular the group consisting of iron, nickel, cobalt, chromium, manganese and mixtures thereof. Most preferably, the first and/or second particulate materials comprise nickel and/or iron.

The first particulate material typically comprises nickel in an amount of at least 10 wt %, such as at least 15 wt % or at least 20 wt %, most preferably at least 30 wt %, such as at least 40 wt % or at least 45 wt %. In the most preferred embodiment, the first particulate material comprises nickel in an amount from 20 wt % to 80 wt %, such as from 30 wt % to 70 wt % or from 35 wt % to 65 wt % (for example from 40 wt % to 60 wt % or from 45 wt % to 55 wt %).

The first particulate material typically comprises iron in an amount of up to 20 wt %, such as from 3 wt % to 15 wt % or from 5 wt % to 10 wt %.

The ratio of different metals (preferably selected from transition metals, such as iron, nickel, cobalt, chromium and manganese) in the cathode may be modified to mitigate the utilisation of the metal, thus minimising the rate of degradation of performance of the electrochemical cell. For example, in a cathode comprising nickel and iron, in which nickel forms the major constituent, by weight, of the metal in the cathode, the iron is fully converted to iron (II) chloride when the cell is charged. This is because the emf of the $Na/FeCl_2$ cell (2.35V) is less than that of the $Na/NiCl_2$ cell (2.58V), leading to a reduction in the utilisation of the nickel in the electrode (as illustrated in the following Table 1).

TABLE 1

| Weight of nickel (g) | Weight of iron (g) | Utilisation (Ah/g) Nickel | Utilisation (Ah/g) Iron + Nickel |
|---|---|---|---|
| 38.39 | 6.14 | 0.40 | 0.48 |
| 36.89 | 8.14 | 0.37 | 0.48 |
| 34.89 | 10.14 | 0.33 | 0.48 |
| 32.89 | 12.14 | 0.30 | 0.48 |
| 30.89 | 14.14 | 0.25 | 0.48 |
| 28.89 | 16.14 | 0.20 | 0.48 |

In one embodiment, the first and/or second particulate materials also comprise aluminium. For example, up to a total of 5 wt % (for example, up to 4 wt %, up to 3 wt %, from 0.01 wt % to 2 wt % or from 0.1 wt % to 1 wt %) of aluminium based on the total weight of the particulate material, may be added to the first and/or second particulate materials.

Typically, the first particulate material comprises nickel, iron, sodium chloride, sodium iodide, sodium fluoride and aluminium.

In one embodiment, the first particulate material may comprise about 35 wt % to 45 wt % sodium chloride, about 1 wt % to 2 wt % sodium fluoride, about 0.1 wt % to 0.5 wt % sodium iodide, about 45 wt % to 55 wt % nickel, about 5 wt % to 10 wt % iron and about 0.5 wt % to 1 wt % aluminium.

The second particulate material may comprise or consist of the same components as the first particulate material, which may be present in the same or different relative amounts by weight. Preferably, the second particulate has a composition that is enriched in sodium chloride compared with the first particulate material (i.e., the percentage weight of sodium chloride in the second particulate material is higher than the percentage weight of sodium chloride in the first particulate material). The second particulate material may consist or consist essentially of sodium chloride.

The second particulate material typically comprises sodium chloride in an amount of at least 40 wt %, such as at least 50 wt % or at least 60 wt %, most preferably at least 65 wt %, such as at least 70 wt %. In the most preferred embodiment, the second particulate material comprises from 50 wt % to 100 wt % sodium chloride, such as from 55 wt % to 90 wt % or from 60 wt % to 80 wt % or from 65 wt % to 75 wt % (for example about 70 wt %).

The second particulate material may comprise sodium fluoride in an amount of up to 20 wt %, such as from 0.1 wt % to 18 wt % or from 5 wt % to 15 wt %. Additionally or alternatively, the second particulate material may comprise sodium iodide in an amount of up to 25 wt %, such as from 0.1 wt % to 20 wt % or from 5 wt % to 20 wt %, more preferably from 10 wt % to 20 wt %.

In one embodiment, the second particulate material may comprise about 67 wt % to 75 wt % sodium chloride, about 6 wt % to 12 wt % sodium fluoride, about 12 wt % to 16 wt % sodium iodide and up to 7 wt % aluminium, preferably from 3 wt % to 6 wt % aluminium.

The presence of the second particulate material can increase the capacity density of the cathode relative to a cathode which does not comprise that material. For example, if the amount of alkali metal halide, such as sodium chloride, in the cell that is derived from the second particulate material is equivalent to about 10 to 80%, such as about 25 to 55% (for example, about 30% or about 50%) of the quantity of alkali metal halide, such as sodium chloride, in the first particulate material (to at least partially occupy the interstices, gaps or spaces formed between the first particulate material), the capacity density can increase by up to 10%, such as up to 20% or 30%, preferably by up to 40%, such as up to 50% (for example, from 0.3 Ah/cc to 0.45 Ah/cc) compared to a granular cathode which does not contain the second particulate material.

An additional advantage of the invention is that hygroscopic components, the presence of which can adversely affect the formation of the first particulate material, can be included in the second particulate material. For example, of the total amount of sodium iodide in the particulate material, preferably from 50 to 100 wt %, such as from 60 to 99 wt % or from 70 to 99 wt %, most preferably from 80 wt % to 99 wt % (for example from 85 wt % to 95 wt %) is contained in the second particulate material with the remainder in the first particulate material. For example, the entirety of the sodium iodide in the cell may be present in the second particulate material.

A further advantage of the cathode of the present invention is that larger amounts (i.e., greater than 50%, preferably greater than 70%, 80% or 90%) of aluminium powder may be contained within the cathode, compared to granular cathodes that do not contain the second particulate material, without adversely increasing the hygroscopicity of the resulting cathode. This is because the majority or all of the aluminium powder may be present in the second particulate material, which may not be subjected to a granulation process.

In one embodiment, therefore, the second particulate material comprises a greater proportion by weight (i.e., greater than 50%, preferably greater than 70%, 80% or 90%) of a hygroscopic material such as aluminium or sodium iodide than the first particulate material. Preferably, the second particulate material comprises the entirety of the hygroscopic material such as aluminium that is contained in the cathode.

The second particulate material has a particle size smaller than that of the first particulate material, which allows it to, at least partially, occupy the interstices, gaps or spaces formed by the first particulate material. Thus, on average, the particles making up the second particulate material are smaller than the particles making up the first particulate material. For example, if the average particle size of the first particulate material is around 0.5 mm, a second particulate material with an average particle size of around 50 μm could be used.

Preferably, the mean size ratio of first particulate material to the second particulate material is from 5,000:1 to 2:1, more preferably from 500:1 to 10:1, most preferably from 100:1 to 10:1, such as about 50:1 or about 15:1.

The first particulate material preferably has a particle size in the range of from 150 μm to 1500 μm, most preferably from 200 to 1250 μm such as from 250 to 1000 μm. In one embodiment, the mean particle size can lie within these ranges. The mean particle size is preferably in the range of from 400 to 1100 μm, such as from 500 to 1000 μm, most preferably from 600 to 900 μm. Typically, no more than 10% of the particles have a particle size less than 250 μm, most preferably less than 300 μm, such as 350 μm and, preferably, at least 90% by volume of the particles have a particle size that does not exceed the upper limit of 1250 μm, more preferably 1200 μm.

The particles of the second particulate material preferably have a particle size of from 0.1 μm to 150 μm, such as 10 to 100 μm, 20 to 80 μm, 20 to 60 μm or 20 to 50 μm. For example, the particle size of the second particulate material is preferably less than 100 μm, most preferably less than 80 μm, such as less than 65 μm. More specifically, the mean particle size of the second particulate material can lie within these ranges and is preferably less than 100 μm, such as less than 75 μm or less than 65 μm, most preferably less than 55 μm. Typically, at least 90% by volume of the particles have a particle size of less than 65 μm, most preferably less than 55 μm.

In one embodiment, the first particulate material is in the form of granules, pellets, beads or flakes and the second particulate material is in the form of a powder, more preferably a free-flowing powder.

In a further embodiment, the nickel powder preferably used in the first and/or second particulate materials preferably has a high surface area of about 0.6 m$^2$/g (BET), and is made by the so-called carbonyl process. In particular, it may be obtained as grades 287 or 255 from Inco Nickel Company. Higher density grade nickel, such as Inco Nickel Company's grade 123, can also be used, but cathodes made from this grade take several cycles to run in; grades 287 and 255, in contrast, are run in during the first charging cycle. In one embodiment, high surface area nickel may be produced in situ by using, as a precursor, NiO powder, which is reduced prior to cathode manufacture.

In one embodiment, the sodium chloride that is present in the first or second particulate materials is preferably finely divided, and it may be Microfine Grade, having a particle size of less than 63 microns and available from Custom Powders Ltd.

Typically, the first and second particulate materials are retained in a compartment or container. The compartment may, for example, form an integral part of an electrochemical cell (for example, a chamber) or be suitable for assembly within an electrochemical cell. The compartment or container advantageously functions as a separator (i.e., separates the anode from the first and second particulate materials in an electrochemical cell). For example, the compartment or container preferably has a wall at least partially comprising a solid electrolyte material, such as beta alumina.

Preferably, the cathode comprises an electrolyte. Thus, the invention also encompasses a cathode comprising the first and second particulate materials together with an electrolyte.

The electrolyte is advantageously dispersed about the first and second particulate materials. The electrolyte is preferably a salt electrolyte that is molten at the operating temperature of the cell, which is typically between 200 and 350° C., such as about 300° C. The electrolyte is typically an alkali metal haloaluminate salt, such as sodium chloroaluminate (NaAlCl$_4$), which is molten (i.e., liquid) at the operating temperature of the cell.

When the alkali metal of the alkali metal halide in the first and/or second particulate materials is sodium and the alkali metal of the haloaluminate salt electrolyte is sodium, suitable compartments or containers are readily available in the form of beta-alumina tubes, which are solid conductors of sodium ions. Thus, the compartment or container preferably comprises a solid conductor of sodium ions such as beta-alumina or Nasicon.

The loading of the first and second particulate materials and the electrolyte typically takes place before sealing (i.e., closing off) the compartment or container. Thus, the compartment or container preferably forms a continuous barrier between the cathode and the anode in an electrochemical cell.

Dispersion of the first and/or second particulate material within the molten salt electrolyte may be achieved simply by wetting the particulate material(s) with the electrolyte in molten liquid form. However, saturating the first and/or second particulate material with the molten salt electrolyte is preferred.

Typically, the ratio of solid to available free volume (i.e., space) in an electrode is about 0.4. A proportion of this free volume is taken up by the molten electrolyte, which is added to the particulates during assembly; some of the remaining volume is necessary to prevent the internal pressure in the electrode from becoming too high when the cell is heated to its operating temperature of around 300° C. In the present invention, the volume of electrolyte used preferably ranges from about ⅔ to ⅘, such as around ½ or ⅔, of the free volume typically used by electrolytes in granular cathodes that do not contain the second particulate material. Thus, typically, less electrolyte by volume (for example about 30% less by volume) is used in the cathode of the present invention compared to a granular cathode that does not contain the second particulate material.

Although, the space available for the electrolyte to disperse about the electrode is reduced by the presence of the second particulate material, surprisingly, such a reduction in volume in electrolyte does not affect the performance of the cell under most conditions.

In the second aspect of the invention, there is provided an electrochemical cell, i.e., a cell comprising an anode, a cathode and an electrolyte. The electrochemical cell comprises the cathode as described above.

In the method of the third aspect of the invention, the step of contacting the first particulate material with the second particulate material can be carried out in various ways. For example, the second particulate material may simply be added to the first particulate material. Contacting of the first particulate material with the second particulate material may occur before or after the particulate materials are added to the compartment, container or cell. Alternatively, the second particulate material may be added to the first particulate material by vibrating the second particulate material into the first particulate material after the first particulate material has been added to the compartment, container or cell. In a further embodiment, the second particulate material may be suspended in a molten salt electrolyte, which may be dispensed into the first particulate material in the compartment, container or cell, preferably under vacuum.

Prior to dispersing the electrolyte about the first particulate material, or the first and second particulate materials, the particulate material(s) may be consolidated (e.g., by tapping) and heated to a temperature greater than the melting temperature of the electrolyte. Thus, consolidation and heating, and hence dispersion of the electrolyte, may be carried out after loading the first particulate material, or the first and second particulate materials, into the compartment or container.

The first particulate material may be prepared by techniques well known to those skilled in the art, for example, by known granulation processes.

Thus, the method may include, prior to contacting the first particulate material with the second particulate material, forming the first particulate material by blending together the mixture comprising the metal(s) and alkali metal halide(s) in powder form to produce a blend. After compacting the powdered blend, the blend is broken up into granules. In one embodiment, the first particulate material is produced by compacting a powder blend through rollers at a pressure between 110 and 120 bar. The compacted flakes are broken down into granules using known techniques.

Cathodes according to the present invention will typically be used in rechargeable electrochemical cells, wherein the anode comprises sodium (the charged anode is molten sodium), the molten salt electrolyte is liquid at the operating temperature of the cell and the anode is separated from the first and second particulate materials, together with the molten salt electrolyte, by a separator which comprises a solid electrolyte material and is preferably a solid conductor of sodium ions. The separator is typically formed by the compartment or container, as described above. The separator may have on its opposite surface from that in communication with the first and second particulate materials, a layer of wicking material for wicking molten anode material over the surface. The cathode may be made in the cell in which it is eventually intended to be used or in a separate cell from which it may be removed after formation and loaded into a cell in which it is eventually to be used either in its charged, uncharged or partially charged state. When the cathode is to be removed after formation, it may be put through several charge/discharge cycles in the cell in which it is formed, before removal.

During the initial charge, the metal (for example, the transition metal, nickel) is halogenated and the alkali metal ions migrate through the liquid electrolyte and separator to the negative electrode where they are converted to molten metal in the charged or partially charged cell. Electrons pass during charging along the external circuit employed for the charging, from the cathode the anode. In principle it is unnecessary to provide any starting alkali metal in the compartment comprising the anode (the anode compartment), the alkali metal being produced during the first charge cycle for use as the anode in the eventual cell.

Thus, for a cathode comprising nickel as the metal and sodium chloride as the alkali metal halide, for example, the following half reactions, (1) and (2), take place in the cathode compartment and the anode compartment, respectively, to give the total cell reaction (3):

$$Ni + 2Cl^- \leftrightarrow NiCl_2 + 2e^- \quad (1)$$

$$2Na^+ + 2e^- \leftrightarrow 2Na \quad (2)$$

$$2NaCl + Ni \leftrightarrow 2Na + NiCl_2 \quad (3)$$

Thus, the sodium generated in reaction (3) is produced in the anode compartment.

To form the cathode of the present invention, sufficient metal(s) (for example, the transition metal nickel) is/are used in the first and second particulate materials so that about 30% of the metal(s) is/are involved in the charging process of the cell, with the remainder acting as an electronically conducting backbone in the cathode compartment, when the cell is fully charged. If less metal(s) is/are used, the cell will still function but is has been found that if more than 50% of the metal(s) is/are involved in the charging process, capacity stability diminishes with decreasing amounts of metal(s).

At the start of the first charge cycle, a wicking material lining the surface of the separator directed into the anode compartment is used to wick anode material over the surface of the separator as it is produced during the first charge cycle.

The separator may be in the form of an elongated tube, with the interior of the tube forming the cathode compartment.

When the interior of the elongated separator tube forms the cathode compartment, the tube may be located in a cell housing which defines the anode compartment, in the interior of the housing. In this construction, the tube will typically be sealed under vacuum, before the first charge cycle.

In the case of a beta-alumina tube comprising a wicking material, as described above, the wicking material may be spread over the surface of the separator facing into the anode compartment.

The main current collector in the cathode of the cell may be a nickel wire or wires or a nickel covered copper wire or wires.

The main current collector in the anode of the cell as described above with the cathode compartment inside a beta alumina tube will usually be the outer casing itself, which will normally be steel.

The wicking material may be a thin, flexible sheet of steel, optionally nickel plated.

The wicking material may be connected to the metal components in the negative electrode by welding or it may be in mechanical contact with these metal components thereby providing an electronically conducting path between the negative terminal and wick material spread over the surface of the separator.

For close packing in batteries, the cell may have an elongate rectangular housing along the interior of which extends the tube in a more or less central position. Naturally, for close packing, cells of similar construction but having a hexagonal cross section can be employed instead.

The molten salt electrolyte is preferably selected so that, at all states of charge, the solubility therein of the transition metal halide(s) (for example, nickel chloride) is at a minimum. This is achieved when the electrolyte comprises a mixture of an alkali metal halide (for example a sodium halide) and an aluminium halide in about a 1:1 mole ratio, with the molten salt being in the presence of at least some solid sodium chloride at all stages of charge, i.e. a neutral electrolyte. When a beta-alumina separator is used, preferably, the only alkali metal present is sodium as other alkali metals may adversely affect the separator. Although pure sodium chloroaluminate can be used, a minor proportion of up to 10% on a molar basis, or more, of the electrolyte may be made up of sodium fluoride, preferably about 5%. It is believed that the sodium fluoride will replace the equivalent proportion of sodium chloride, so that the electrolyte retains said 1:1 mole ratio of alkali metal halide to aluminium halide. The proportion of sodium fluoride will, however, be sufficiently low for the electrolyte to retain its essential character as a sodium chloroaluminate electrolyte.

When the first and/or second particulate materials comprise aluminium, during the initial charge cycle of the cell, extra $NaAlCl_4$ as well as a small amount of sodium to help prime the wicking layer and provide some overdischarge capability, is produced according to the reaction:

$$Al + 4NaCl \rightarrow NaAlCl_4 + 3Na \quad (4)$$

During discharge of the cell, the metal halide(s) (for example, a transition metal chloride such as nickel chloride) is/are reduced to metallic metal(s). Even though the transition metal nickel, for example, has a high surface area, the continual reformation of nickel on cycling causes the nickel crystals to grow in size and loose surface area. As this happens, capacity is lost. To help prevent crystal growth of the nickel and maintain, or even enhance its surface area, a dopant can be added in small quantities to the first and/or second particulate materials. The dopant may be in the form of a chalcogen, such as sulphur or selenium; a metal chalcogenide, such as a sulphide or selenide of Fe, Co, Ni and Mo; or certain transition metals, such as Co, Fe, Ti, V, W and Mo.

Preferred aspects of the invention are illustrated in the following non-limiting examples, with reference to the following drawings.

In the examples and throughout this specification, all percentages, parts and ratios are by weight unless indicated otherwise.

EXAMPLES

Example 1

Construction of an Electrochemical Cell

Referring to FIG. 1, the electrochemical cell 13 in accordance with the invention has a cylindrical casing 1. A beta alumina tube 2 is located concentrically within the casing. The tube 2 is attached to an alpha alumina ring 3, by means of a glass seal. Two nickel parts 4 and 5 are bonded to the alpha alumina ring 3 to provide a leak tight seal. A current collector assembly comprising two nickel wires 6 attached to a metal ring 7, is welded to the inner nickel ring 5. A closure cap 8 with positive terminal 9 is welded to the metal ring 7, closing off tube 2. A bridging piece 10 is welded to the outer nickel part 4 and the case 1 is welded to this bridging piece. A metal end cap 11 is welded to the case 1.

Around the outside of the tube 2 is a close fitting rolled steel shim (not shown) having at least two turns. This covers most of the tube 2 and extends to and is in electrical contact to the end cap 11. This configuration provides the initial electronic contact between the cell case 1 and the tube 2 and subsequently acts as a wick to keep the sodium metal in contact with tube 2 over most of its length. The steel shim is typically in the form of a cylinder, which may be fabricated by spot welding the steel sheet around a former. The cylinder may then be fitted on the beta alumina tube 2 and one end of the cylinder sandwiched between the closure cap 8 and the cell before the cell cap is welded to the casing 1.

An anode compartment is thus provided outside the tube 2, within the casing 1, with a cathode compartment 12 being provided inside the tube 2, the beta-alumina tube 2 hence constituting a separator between the anode and cathode compartments. The first and second particulate materials, as described above, are introduced into the cathode compartment 12. The anode compartment initially contains no anode material. Sufficient molten $NaAlCl_4$ electrolyte is added to the cathode compartment to disperse about the first and second particulate materials so that the particulate materials are impregnated with the electrolyte, and the electrolyte wets the separator or tube 2. The loading of the first and second particulate materials into the compartment 12 and the dispersion of the electrolyte about the particulate materials naturally takes place before closing off of the tube 2 as hereinbefore described. The beta-alumina tube 2 hence forms a continuous barrier between the electrolyte- and particulate material-containing compartment 12 and the anode compartment, within the casing 1. Initially, electronic contact is provided between the outside of the tube 2 and the casing 1 by the steel shim (not shown). Later, when sodium passes through the separator on charging, it will build up sufficiently in the anode compartment to provide direct contact between the tube 2 and casing 1. If desired, an optional porous wicking layer (not shown), typically containing carbon particles, may be provided as a lining on the outer surface of the tube 2 to facilitate wetting of the outside of the tube 2 with sodium and to promote electronic contact with the shim.

Example 2

Figure 2:
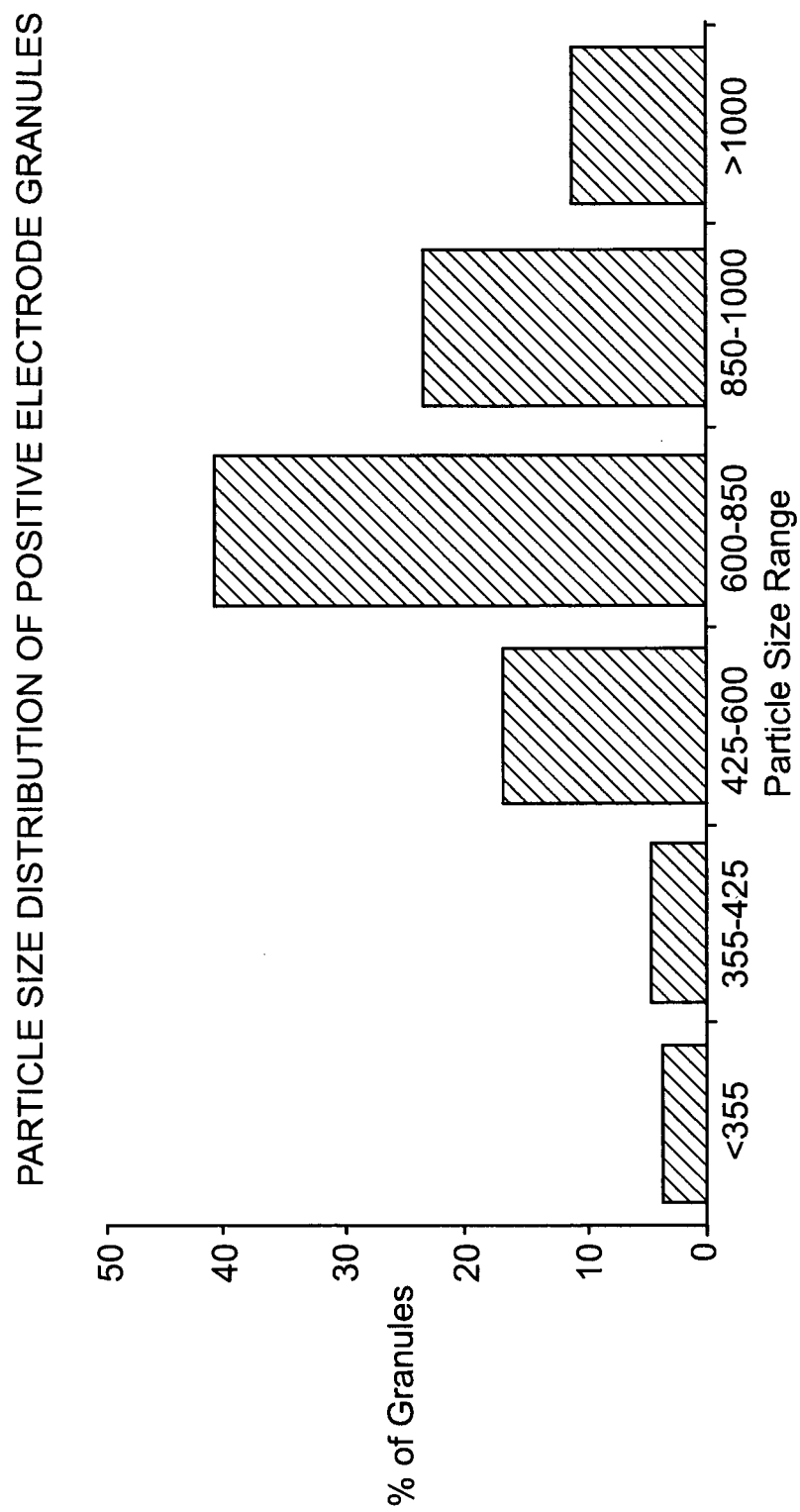
FIG. 2 shows the preferred particle size distribution of the first particulate material. Particulate material having a particle size below 355 μm is regarded as fines and is typically re-compacted.
Figure 3:
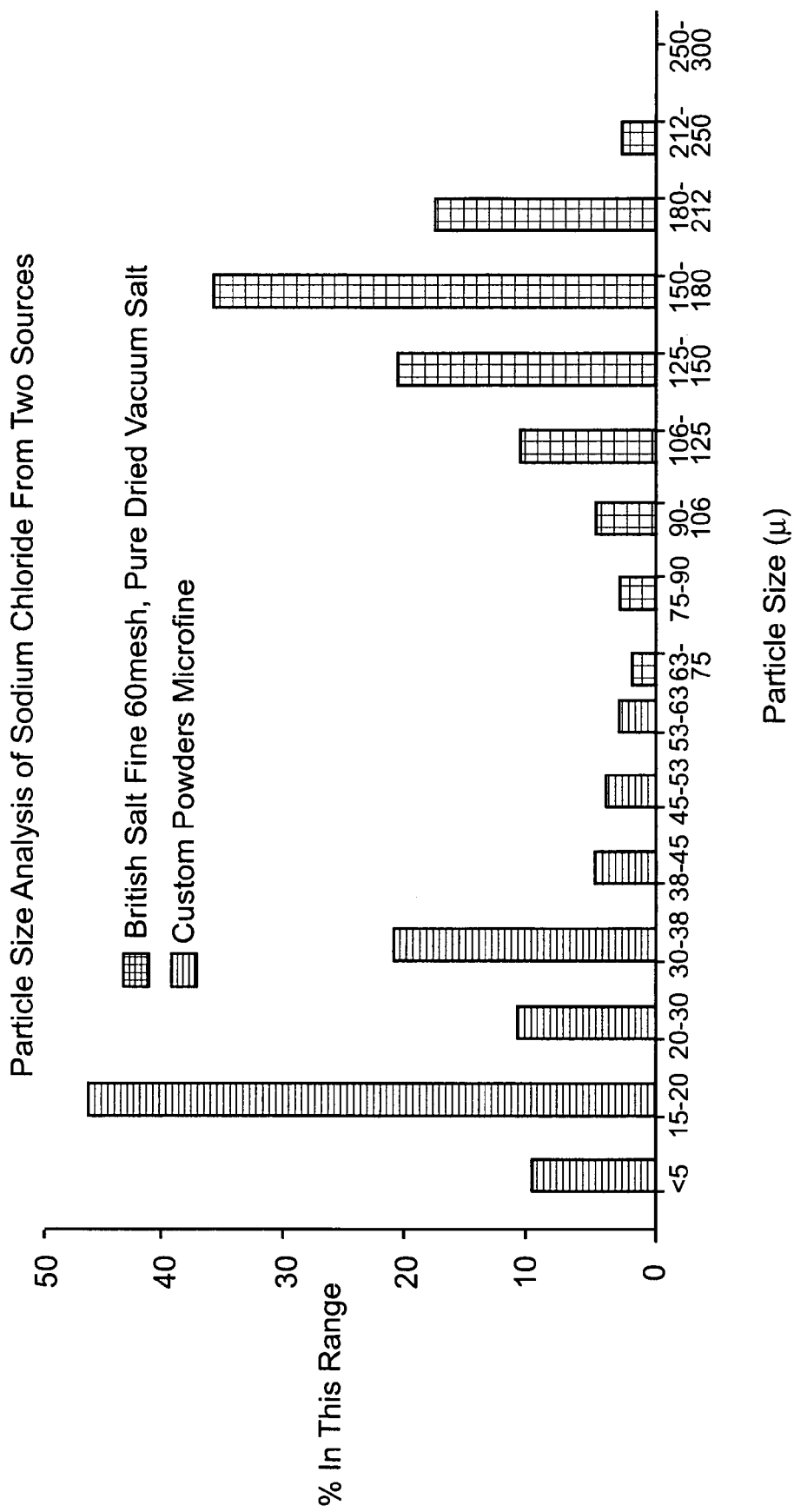
FIG. 3 shows an example of a particle size distribution of powdered sodium chloride from two sources, for use in the first or second particulate materials.

Positive electrode granules were manufactured using known methods by which a blended mixture of sodium chloride powder (a grade known as Microfine salt available from Custom Powders Ltd) having a particle size of less than 63 microns, nickel (INCO 287) powder, iron powder and small quantities of sodium fluoride, sodium iodide and aluminium powder, was dried and compacted into a dense sheet before being broken into granules with a size range as shown in FIG. 2. 80 g of these granules were vibrated into a beta-alumina tube of cell 13 in Example 1 (having an internal diameter of 28.5 mm and internal volume of 48 cc). The cell was heated to about 300° C. to remove any moisture. 37 g of molten sodium chloroaluminate was introduced under vacuum into the positive electrode compartment so that the molten salt dispersed about (impregnated) the granules. The positive electrode compartment was then sealed by welding on a top cap. The cell was then heated to 300° C. and charged at a current of 0.5 amps at a voltage of 2.67V. The charge was terminated when the current fell to 0.2 amps.

The cell was then discharged at 0.3 amps to a voltage of 2.0V at 200° C. The capacity obtained was 13.85 Ah.

Example 3

Positive electrode granules were manufactured in accordance with the method of Example 2 above. 80 g of these granules were vibrated into a beta alumina tube of cell 13 in Example 1 (having an internal diameter of 28.5 mm and internal volume of 48 cc). Microfine salt was added to the granules whilst the beta alumina tube was being vibrated. The addition of Microfine salt was halted when it was visible on top of the granule bed. 10 g of Microfine salt was added. The cell was heated to above the melting point of the sodium chloroaluminate and 25.1 g of molten sodium chloroaluminate was introduced into the positive electrode compartment so that the molten salt dispersed about (impregnated) the granules and powder mix (Microfine salt). The positive electrode compartment was then sealed by welding on a top cap. The cell was heated to 300° C. and charged at a maximum current of 0.5 amps at a voltage of 2.67V. As in Example 2, the charge was terminated when the current fell to 0.2 amps.

Figure 4:
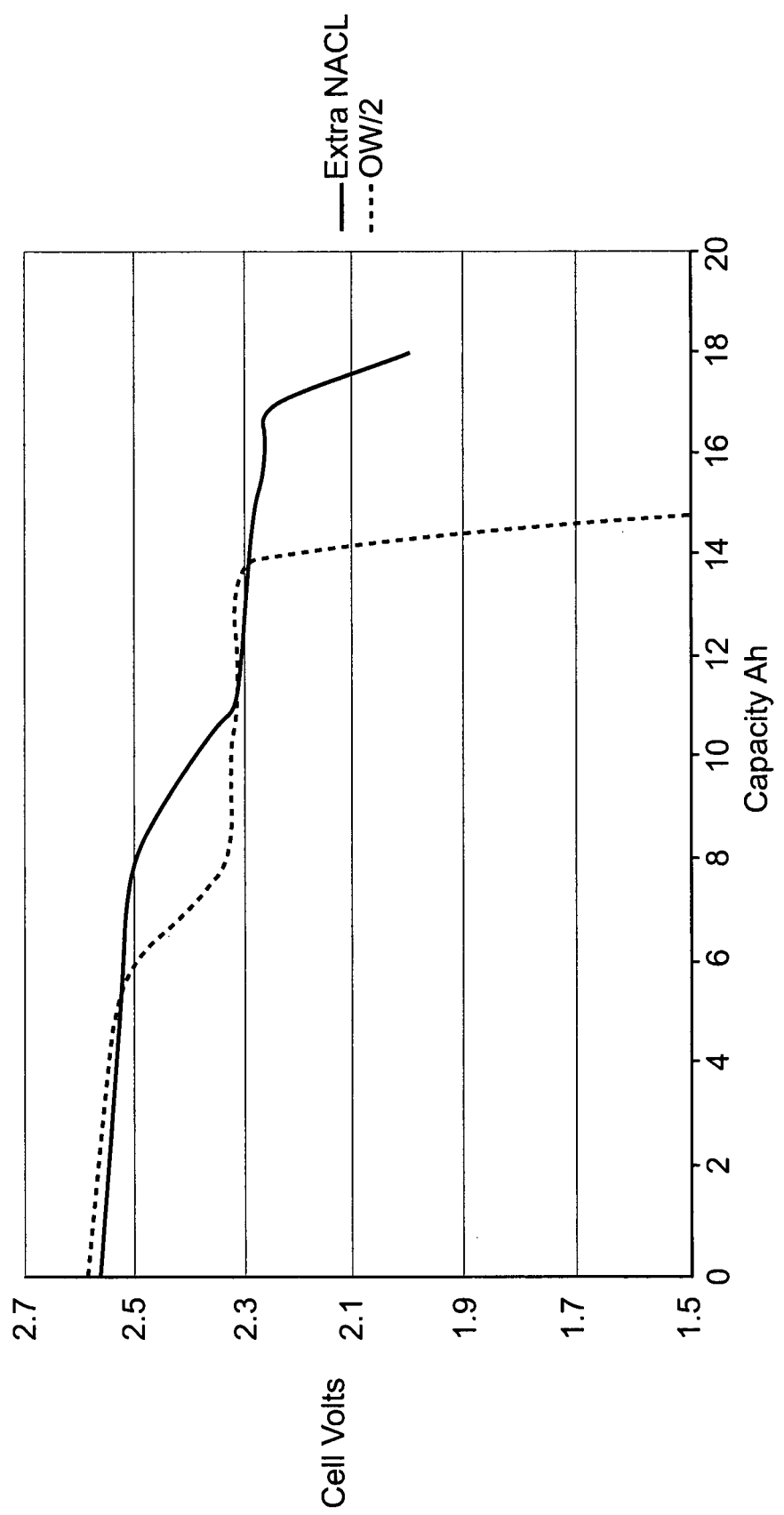
FIG. 4 shows a plot of voltage against capacity density of a cell in accordance with the present invention compared to a granular electrode.

The cell was cooled to 200° C. and discharged at a current of 0.3 amps. The capacity obtained to a cut off voltage of 2.0V was 18 Ah. This represents more than a 30% increase in capacity compared to the cell in Example 2 with the standard granular electrode. This is illustrated in Table 2 (below) and FIG. 4. In FIG. 4, the discharge curve of this cell is compared with that of the cell of Example 2. It can be seen that the extra capacity delivered by the cell of the present invention was 4.2 Ah. The extra capacity expected from the addition of 10 g sodium chloride is 4.6 Ah. Thus, it can be seen that almost all of the sodium chloride added to the electrode contributes to the discharge capacity of the cell.

TABLE 2

| Cell Capacity (Ah) | OW/2 Cell Volts | OW/2 + 10 g extra NaCl Cell Volts |
|---|---|---|
| 0 | 2.58 | 2.56 |
| 2 | 2.562 | 2.545 |
| 4 | 2.545 | 2.532 |
| 6 | 2.5 | 2.518 |
| 8 | 2.335 | 2.5 |
| 10 | 2.325 | 2.4 |
| 11 | 2.315 | 2.32 |
| 12 | 2.305 | 2.3 |
| 14 | 2.26 | 2.29 |
| 16 | 0 | 2.26 |
| 17 | 0 | 2.245 |
| 18 | 0 | 2 |

The invention claimed is:

1. A cathode for an electrochemical cell comprising:
 a first particulate material having particles comprising a mixture of at least one alkali metal halide and at least one metal selected from the group consisting of iron, nickel, cobalt, chromium, manganese and mixtures thereof, wherein the at least one alkali metal halide first particulate material comprises sodium chloride;
 a second particulate material consisting of sodium chloride, and
 an electrolyte dispersed about the first and second particulate materials, wherein the electrolyte is a salt electrolyte that is molten at an operating temperature of the electrochemical cell; and
 wherein a mean particle size ratio of the first particulate material to the second particulate material varies from 500:1 to 10:1.

2. A cathode according to claim 1, wherein the alkali metal halide of the first particulate materials further comprises at least one of sodium fluoride, sodium iodide, or mixtures thereof.

3. A cathode according to claim 1, wherein the first particulate material further comprises aluminum.

4. A cathode according to claim 1, wherein the mean particle size of the first particulate material is from 400 to 1100 and wherein the mean particle size of the second particulate material is from 0.8 to 110 μm.

5. A cathode according to claim 1, wherein the electrolyte is an alkali metal haloaluminate salt.

6. A cathode according to claim 5, wherein the alkali metal haloaluminate salt is sodium chloroaluminate.

7. A cathode according to claim 1, wherein the weight ratios of the first particulate material to the second particulate material vary from 10:1 to 1:1.

8. A cathode according to claim 1, wherein the mean particle size ratio of the first particulate material to the second particulate material varies from 100:1 to 10:1.

9. The cathode for an electrochemical cell of claim 1, wherein the first particulate material is in the form of granules, pellets, beads, or flakes, and the second particulate material is in the form of a powder.

10. The cathode for an electrochemical cell of claim 9, wherein the second particulate material is in the form of a free-flowing powder.

* * * * *

UNITED STATES PATENT AND TRADEMARK OFFICE
CERTIFICATE OF CORRECTION

PATENT NO. : 9,065,133 B2
APPLICATION NO. : 12/519784
DATED : June 23, 2015
INVENTOR(S) : Sudworth Page 1 of 1

It is certified that error appears in the above-identified patent and that said Letters Patent is hereby corrected as shown below:

In the claims

Claim 4, Line 2, following "400 to 1100" insert --µm,--

Signed and Sealed this
Third Day of May, 2016

Michelle K. Lee
*Director of the United States Patent and Trademark Office*